(12) United States Patent
Wang

(10) Patent No.: US 6,843,270 B1
(45) Date of Patent: Jan. 18, 2005

(54) CONNECTOR OF INFLATING DEVICE CAPABLE OF COUPLING VARIOUS TYPES OF VALVE STEMS

(76) Inventor: Lo-Pin Wang, 16E-2, No. 17, Lane 52, Sec. 3, Re He Rd., Taichung (TW)

( * ) Notice: Subject to any disclaimer, the term of this patent is extended or adjusted under 35 U.S.C. 154(b) by 0 days.

(21) Appl. No.: 10/741,449

(22) Filed: Dec. 22, 2003

(51) Int. Cl.$^7$ ............................................. F16K 15/20
(52) U.S. Cl. ..................... 137/231; 137/223; 137/627; 251/251; 152/415
(58) Field of Search ................. 137/231, 627, 137/798; 152/415, 421; 251/148, 251

(56) References Cited

U.S. PATENT DOCUMENTS

| | | | | |
|---|---|---|---|---|
| 5,645,100 A | * | 7/1997 | Chuang et al. | ............ 137/223 |
| 5,749,392 A | * | 5/1998 | Glotin | ........................ 137/231 |
| 5,819,781 A | * | 10/1998 | Wu | ............................. 137/231 |
| 6,631,729 B2 | * | 10/2003 | van der Blom | ............. 137/231 |

* cited by examiner

Primary Examiner—Ramesh Krishnamurthy
(74) Attorney, Agent, or Firm—Browdy and Neimark, P.L.L.C.

(57) ABSTRACT

A connector of an inflating device has a housing having a central chamber and three side chambers. Three connector assemblies are mounted in the side chambers respectively to be coupled with various types of valve stems. Each of the connector assemblies have a valve member and an elastic member, wherein the valve member moves between a close position, in which the valve member isolates the side chamber from the central chamber, and an open position, in which the valve member keeps the side chamber communicated with the central chamber. A rotary member mounted on the housing for rotation to respectively push the valve members of the connector assemblies from the close positions to the open position while the rotary member is turn for the cam portion orientating the side chambers respectively.

4 Claims, 5 Drawing Sheets

CONNECTOR OF INFLATING DEVICE CAPABLE OF COUPLING VARIOUS TYPES OF VALVE STEMS

BACKGROUND OF THE INVENTION

1. Field of the Invention

The present invention relates to an inflating device, and more particularly to a connector of the inflating device, which can be coupled with various types of valve stems.

2. Description of the Related Art

A conventional inflating device, such as air pump or inflator, has a connector to be coupling with a valve stem of a specific object, such as a tire, for inflation or deflation. The most popular types of the valve stems are the Presta valve, the Schrader valve and the Dunlop valve. The connector must meet the very type of the valve stem for inflation and deflation.

User might buy the products with various types of valve stems so that they need an air pump that can inflate or deflate by the very type of the valve stems. It is inconvenient and cost much to replace various types of connectors of the air pump.

SUMMARY OF THE INVENTION

The primary objective of the present invention is to provide a connector of an inflating device, which can be coupled with three types of valve stems for inflation and deflation.

The secondary objective of the present invention is to provide a retractable handle, which tubes are shorter in lengths.

The third objective of the present invention is to provide a retractable handle having lock devices, which the lock devices reduce the friction of the handle while it is extended and retracted.

According to the objective of the present invention, a connector comprises a housing having a central chamber and three side chambers around the central chamber and communicated with the central chamber. The housing has openings at where the central chamber and the side chambers are. Three connector assemblies are mounted in the side chambers respectively to be coupled with various types of valve stems. Each of the connector assemblies have a valve member and an elastic member, wherein the valve member moves between a close position, in which the valve member is moved inwardly to isolate the side chamber from the central chamber, and an open position, in which the valve member is moved outwardly to keep the side chamber communicated with the central chamber and the elastic member is exerted on the valve member and adapted to force to valve member to the close position. A rotary member mounted on the housing for rotation. The rotary member has a cam portion to respectively push the valve members of the connector assemblies from the close positions to the open position while the rotary member is turn for the cam portion orientating the side chambers respectively.

DETAILED DESCRIPTION OF THE INVENTION

Figure 1:
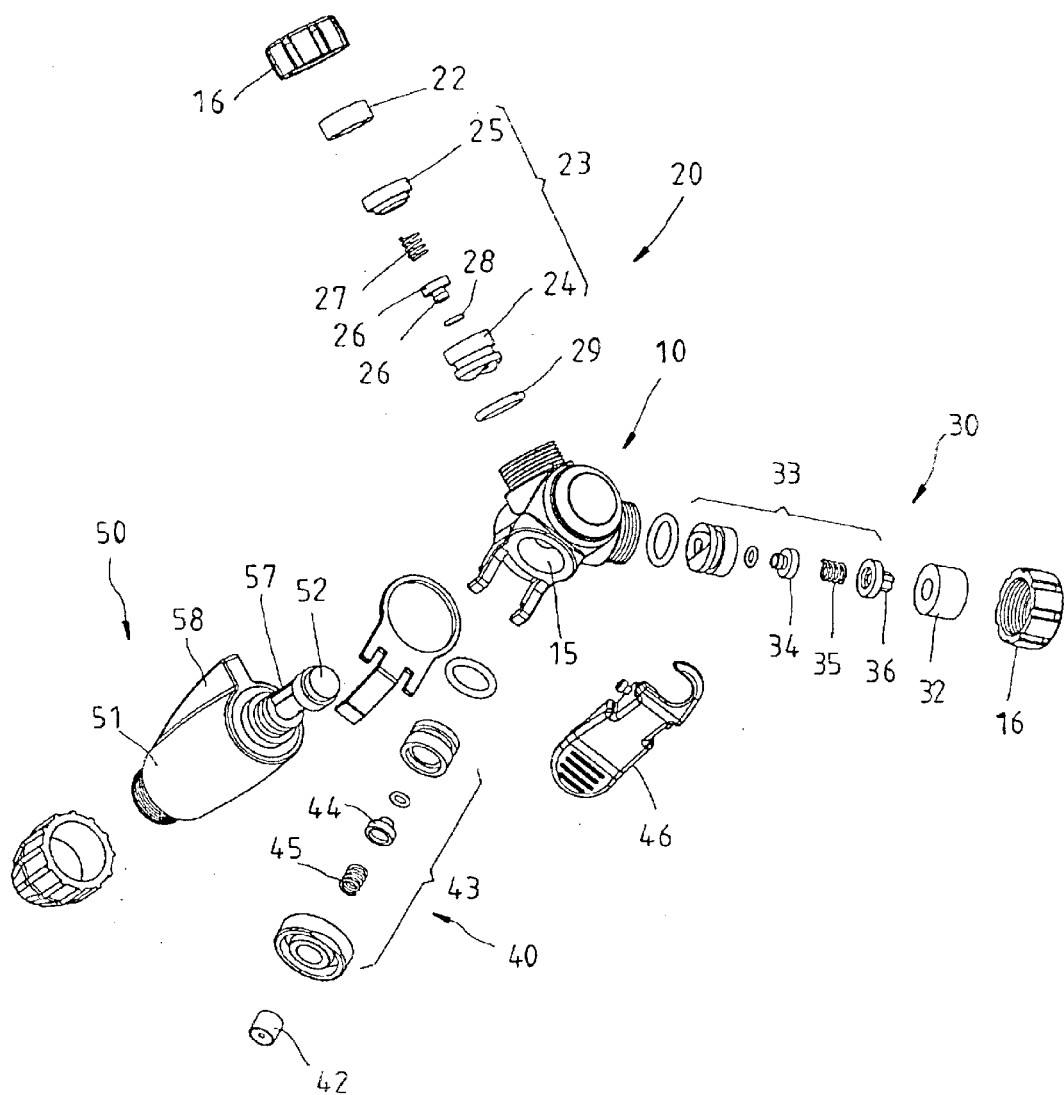
FIG. 1 is an exploded view of a preferred embodiment of the present invention.
Figure 2:
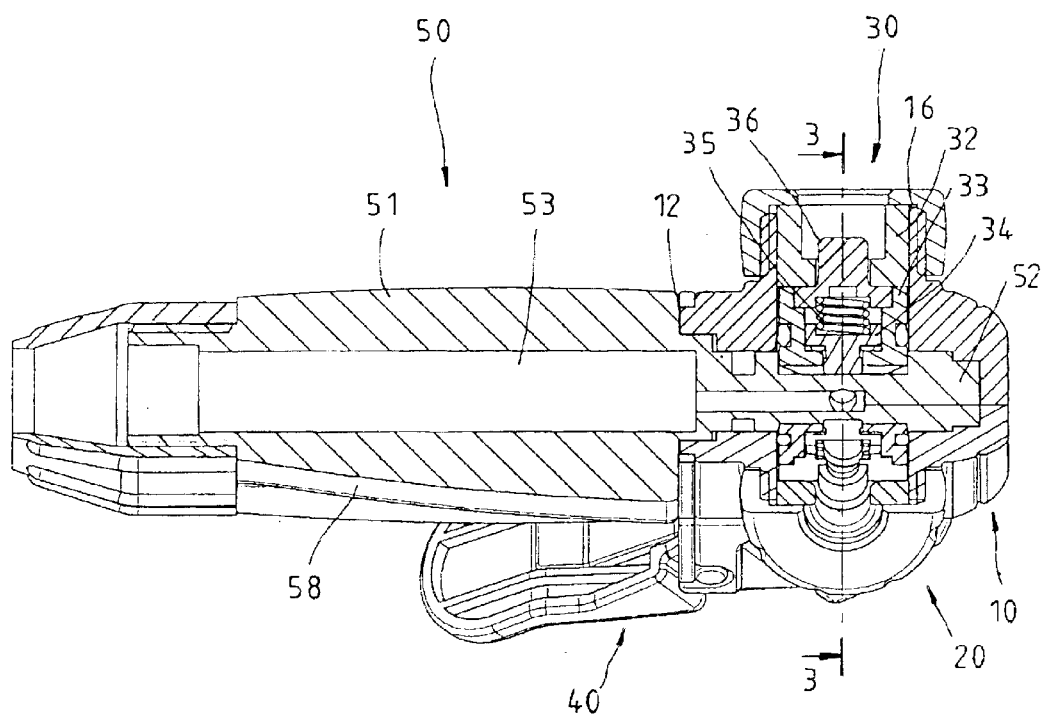
FIG. 2 is a sectional view from a lateral side of the preferred embodiment of the present invention.
Figure 3:
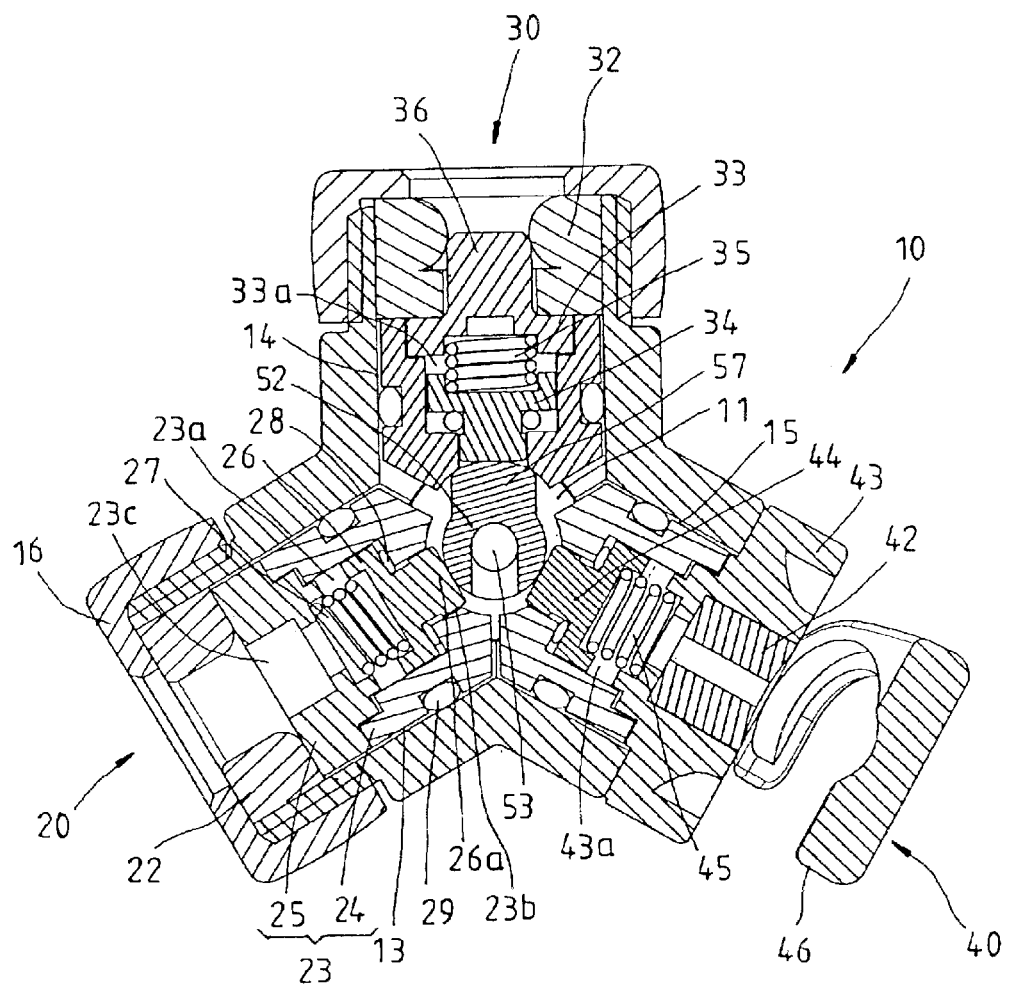
FIG. 3 is a sectional view of the 3—3 line in FIG. 1, showing the first sliding member moved to the proximal position.

As shown in FIGS. from FIG. 1 to FIG. 3, a connector of the preferred embodiment of the present invention comprises a housing 10, a first connector assembly 20, a second inflating device 30, a third inflating device 40 and a rotary member 50, wherein the connector assemblies 20, 30 and 40 are mounted in the housing 10 and the rotary member 50 is pivoted on the housing 10.

The housing 10 has a cylindrical central chamber 11 therein, a first side chamber 13, a second side chamber 14 and a third side chamber 15 around the central chamber 11 in an average distribution and communicated with the central chamber 11 respectively. The housing has an opening 12 communicating an end of the central chamber 11 with outside and the other end of the chamber is close. The housing 10 is open respectively at where the side chambers 13, 14 and 15 so that the central chamber 11 is communicated with outside respectively via the side chambers 13, 14 and 15 too. Two covers 16, which respectively have an opening at a center thereof, are respectively screwed onto the housing 10 at where the distal ends of the first and the second side chambers 13 and 14 are so that the first and the second side chambers 13 and 14 are still communicated with outside via the openings of the covers 16. The openings of the covers 16 are respectively smaller than the diameters of the first and the second side chambers 13 and 14.

The first, the second and the third connector assemblies 20, 30 and 40 are mounted in the first, the second and the third side chambers 13, 14 and 15 respectively. In the present invention, the first, the second and the third connector assemblies 20, 30 and 40 are able to couple the Presta valve stem, the Schrader valve stem and the Dunlop valve stem respectively.

Figure 4:
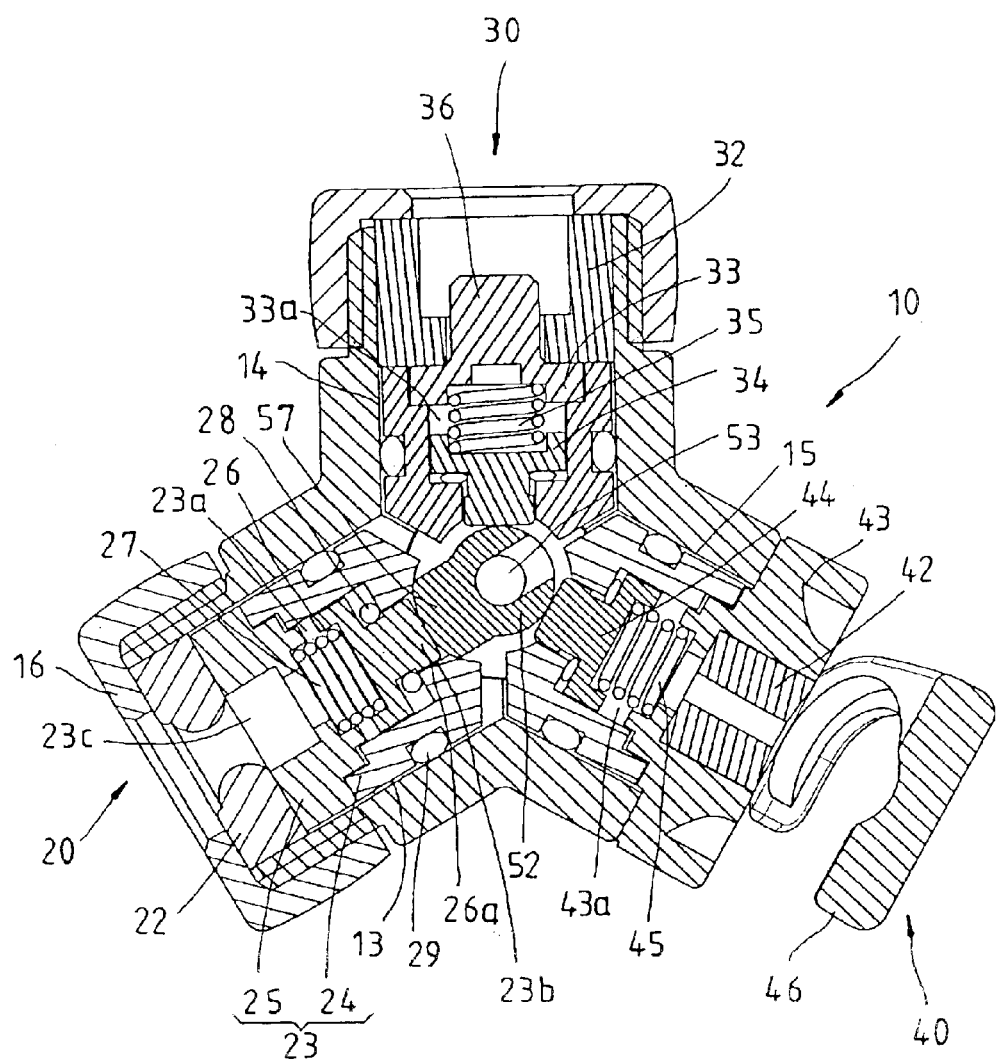
FIG. 4 is similar to FIG. 3, showing the first sliding member moved to the distal position.
Figure 5:
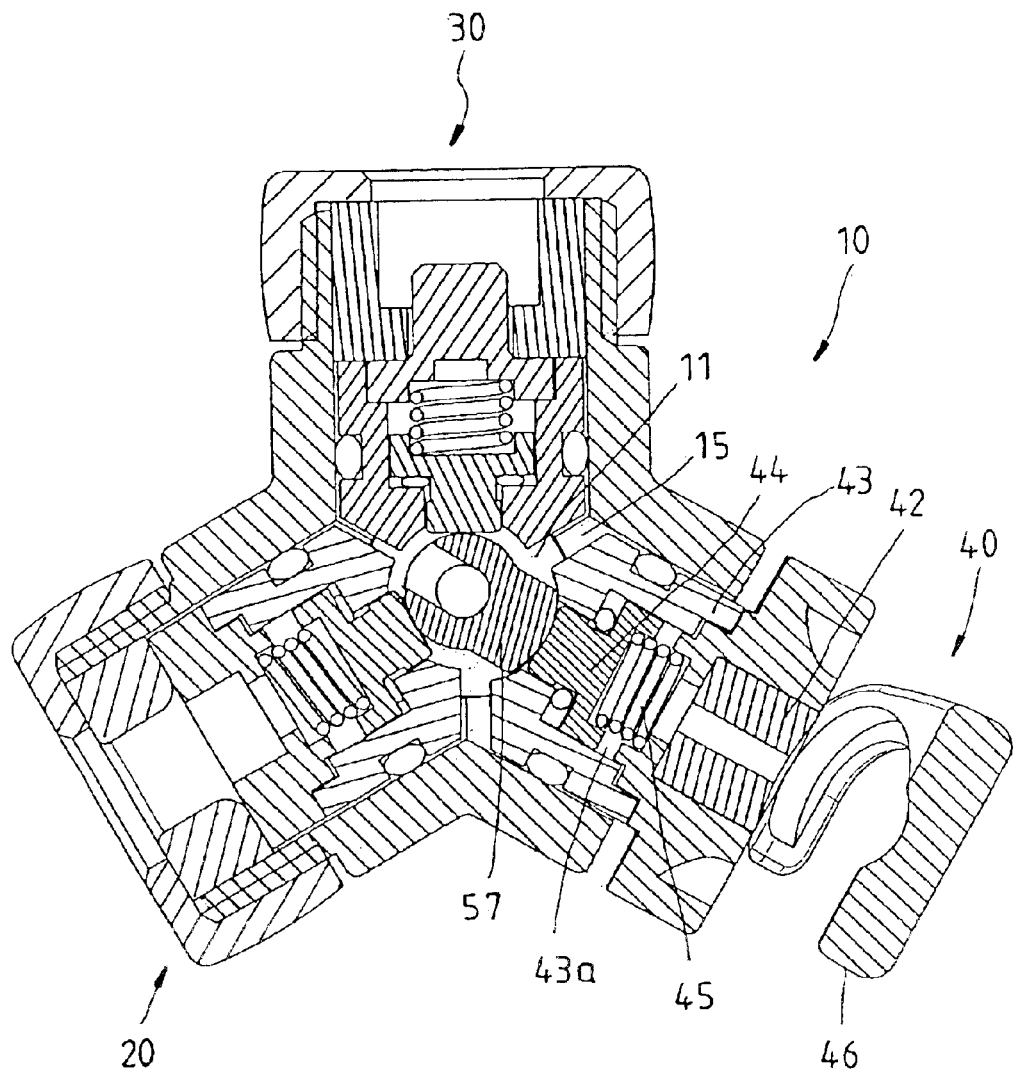
FIG. 5 is similar to FIG. 3, showing the rotary member rotated to a position where the cam portion thereof orientates the third connector assembly.

The first connector assembly 30 has a first elastic ring 22, a sliding member 23, a valve member 26 and an elastic member 27. The first elastic ring 22 is made of a flexible material, such as rubber, and is mounted in the cover 16. The sliding member 23 consists of a main member 24 and a base 25, wherein the first elastic ring 22 is attached on an end of the base 25 and the main member 24 is attached on the other end of the base 25. The sliding member 23 has a chamber 23a between the main member 24 and the base 25, a first eyelet 23b on the main member 24 to communicate the chamber 24 with the central chamber 11 and a second eyelet 23c on the base 23 to communicate the chamber 24 with outside via the opening of the cover 16. The main member 24 is mounted with an O-ring 29. The sliding member 23 is able to move between a proximal position, in which the sliding member 23 moves inwardly along the first side chamber 13 as shown in FIG. 3, and a distal position, in which the sliding member 23 moves outwardly as shown in FIG. 4. The valve member 26 is received in the chamber 23a of the sliding member 23 for movement between a close position, in which the valve member 26 moves inwardly as shown in FIG. 3, and an open position, in which the valve member 26 moves outwardly as shown in FIG. 4. The elastic member 27, which is a spring in the present invention, is mounted in the chamber 23b to be exerted on the valve member 26. The elastic member 27 is adapted to move the valve member 26 to the close position. While a Presta valve stem (not shown) is inserted into the first side chamber 13, it runs through the opening of the cover 16, the second eyelet 23c and the elastic member 27 to be attached on the valve member 26.

The second connector assembly 30, which is similar to the first connector assembly 20, has a second elastic ring 32, a sliding member 33 with a chamber 33a therein, a valve member 34 for movement between a close position and an opening position and an elastic member 35. The sliding member 33 is further provided with a post 36 at a bottom thereof, which the post 36 runs through the second elastic ring 32 to push a check valve of a Schrader valve stem (not shown). The second connector assembly 30 is able to couple the Schrader valve stem.

The second connector assembly 40, which is similar to the first connector assembly 20, has a second elastic ring 42, a sliding member 43 with a chamber 43a therein, a valve member 44 for movement between a close position and an opening position and an elastic member 45. The second connector assembly 40 is further provided with a clip member 46 to hold a Dunlop valve stem (not shown).

The rotary member 50 has a main member 51 and an axle member 52, wherein the axle member 52 is received in the central chamber 11 of the housing 10 and the main member 51 is left out of the housing 10 via the opening 12. The rotary member 50 further has a tunnel 53 therein extended from the main member 51 to the axle member 52, wherein an end of the tunnel 53 at the main member 51 is open and the axle member 52 has an eyelet communicated with the tunnel 53, such that the rotary member 50 can mount a tube (not shown), which connects to an air supply device (not shown), on the main member 51 to make air flowing in the tunnel 53 and flowing out via the eyelet on the axle member 52. The axle member 52 further has a cam portion 57 and the cam portion 57 will move to the first, the second and the third side chambers 13, 14 and 15 respectively while the rotary member 50 rotates. For example, while the rotary member 50 rotates and turns the cam portion 53 to the first side chamber 13, the cam portion 53 will push the sliding member 23 and the valve member 24 outwardly, in the other words, the sliding member 23 is moved to the distal position and the valve member 24 is moved to the open position. The cam portion 53 will do the same work to the second and the third connector assemblies 30 and 40 while the cam portion 53 is turn to the second and the third side chambers 14 and 15 respectively. The main member 51 is provided with an index 58 for identification of the position of the cam portion 53.

For example, if there is a tire with a Presta valve stem to be inflated or deflated, as shown in FIG. 3 and FIG. 4, the cam portion 57 has to be turned away from the first side chamber 13 first such that the valve stem (not shown) can be inserted into the first connector member 30, and then the rotary member 57 is turned back for the cam portion 57 moving to the first side chamber 13 such that the sliding member 23 is moved to the distal position to make the first elastic 22 deformed and hold the valve stem fixedly. In the meantime, the valve member 26 is moved to the open position by the cam portion 57 to push the check valve of the valve stem such that air flow from the air supply device flow through the tunnel 53 of the rotary member 50, the central chamber 11, the first eyelet 23b and at last to the chamber 23a of the sliding member 23 to inflate the object via the valve stem. After inflation or deflation, the rotary member 50 is turned for the cam portion 57 moving away, the sliding member 23 is moved back to the proximal position by the elastic member 27 and the first elastic ring 22 has been recovered to the original shape. The valve stem can be removed from the first connector assembly 30.

For the same principle and operating steps, the objects having the Schrader valve stem and the Dunlop valve stem can be inflated or deflated in the second connector assembly 40 and the third connector assembly 50 respectively.

What is claimed is:

1. A connector of an inflating device, comprising:
   a housing having a central chamber, a first side chamber, a second side chamber and a third side chamber, wherein the first side chamber, the second side chamber and the third side chamber are arranged around the central chamber and are communicated with the central chamber;
   wherein the housing is open at where the first side chamber, a second side chamber and a third side chamber are and has an opening communicated with the central chamber,
   a first connector assembly, a second connector assembly and a third connector assembly respectively mounted in the first, the second and the third side chamber of the housing to be coupled with various types of valve stems;
   wherein the first connector assembly has a valve member and an elastic member, wherein the valve member moves between a close position, in which the valve member is moved inwardly to isolate the first side chamber from the central chamber, and an open position, in which the valve member is moved outwardly to keep the first side chamber communicated with the central chamber and the elastic member is exerted on the valve member and adapted to force to valve member to the close position;
   wherein the second connector assembly has a valve member and an elastic member, wherein the valve member moves between a close position, in which the valve member is moved inwardly to isolate the second side chamber from the central chamber, and an open position, in which the valve member is moved outwardly to keep the second side chamber communicated with the central chamber and the elastic member is exerted on the valve member and adapted to force to valve member to the close position;
   wherein the third connector assembly has a valve member and an elastic member, wherein the valve member moves between a close position, in which the valve member is moved inwardly to isolate the third side chamber from the central chamber, and an open position, in which the valve member is moved outwardly to keep the third side chamber communicated with the central chamber and the elastic member is exerted on the valve member and adapted to force to valve member to the close position, and
   a rotary member pivoted on the housing for rotation, wherein the rotary member has a main member left of the housing, an axle member received in the central chamber and a tunnel therein to be communicated with the central chamber,
   wherein the rotary member has a cam portion to respectively push the valve members of the first, second and the third connector assemblies from the close positions to the open position while the rotary member is turned for the cam portion orientating the first, the second and the third side chambers respectively.

2. The connector as defined in claim 1, wherein each of the first, the second and the third connector assemblies further has a sliding member and an elastic ring, wherein the sliding member has a chamber to receive the valve member and the elastic member therein and the chamber is communicated with the central chamber while the valve member is moved to the open position and is isolated from the central chamber while the valve member is moved to the close position.

3. The connector as defined in claim 2, wherein the sliding member moves between a distal position, in which the sliding member presses the elastic member to make it deformed, and a proximal position, in which the sliding member does not press the elastic member deformed.

4. The connector as defined in claim 1, wherein the rotary member has an index member on the main member to identify the location of the cam portion.

* * * * *